(12) United States Patent
Li et al.

(10) Patent No.: US 9,215,185 B2
(45) Date of Patent: Dec. 15, 2015

(54) SYSTEM, METHOD AND TRANSMISSION DEVICE FOR TRANSMITTING DATA VIA MULTI-CHANNEL COMMUNICATIONS

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hai-Sheng Li, Shenzhen (CN); Chih-San Chiang, New Taipei (TW); Min Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 83 days.

(21) Appl. No.: 14/060,604

(22) Filed: Oct. 22, 2013

(65) Prior Publication Data

US 2014/0301284 A1 Oct. 9, 2014

(30) Foreign Application Priority Data

Apr. 3, 2013 (CN) .......................... 2013 1 0114382

(51) Int. Cl.
*H04L 12/805* (2013.01)
*H04L 29/08* (2006.01)

(52) U.S. Cl.
CPC ............ *H04L 47/365* (2013.01); *H04L 69/324* (2013.01)

(58) Field of Classification Search
None
See application file for complete search history.

(56) References Cited

U.S. PATENT DOCUMENTS

2008/0137634 A1* 6/2008 Hassan et al. ................ 370/343
2014/0153489 A1* 6/2014 Perras et al. ................. 370/328

FOREIGN PATENT DOCUMENTS

CN 1980133 A 6/2007
TW 201132076 A 9/2011

* cited by examiner

*Primary Examiner* — Gary Mui
(74) *Attorney, Agent, or Firm* — Novak Druce Connolly Bove + Quigg LLP

(57) ABSTRACT

A method for transmitting data via multi-channel communications is provided. The method comprises following steps: providing transmission modes to be selected and determining transmission channels and transmission modules corresponding to the selected transmission modes; splitting a piece of data to be transmitted to a number of data segments, the number of the data segments being same to a number of the determined transmission channels; labeling a sequence number to each data segment; distributing the labeled data segments to determined transmission modules correspondingly; and transmitting the labeled data segments via the corresponding determined transmission channels. A system and a transmission device for transmitting data via multi-channel communications are also disclosed.

6 Claims, 2 Drawing Sheets

SYSTEM, METHOD AND TRANSMISSION DEVICE FOR TRANSMITTING DATA VIA MULTI-CHANNEL COMMUNICATIONS

BACKGROUND

1. Technical Field

The present disclosure relates to a system, a method and a transmission device for transmitting data via multi-channel communications.

2. Description of Related Art

Although communication devices have a number of data transmission modes, such as Bluetooth transmit mode, a WiFi transmission mode and so on, only one mode can be employed each time to transmit a piece of data such as a song. Therefore, there is a need to transmit a piece of data via a number of data transmission modes, thus to reduce time and improve the efficiency of transmission.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
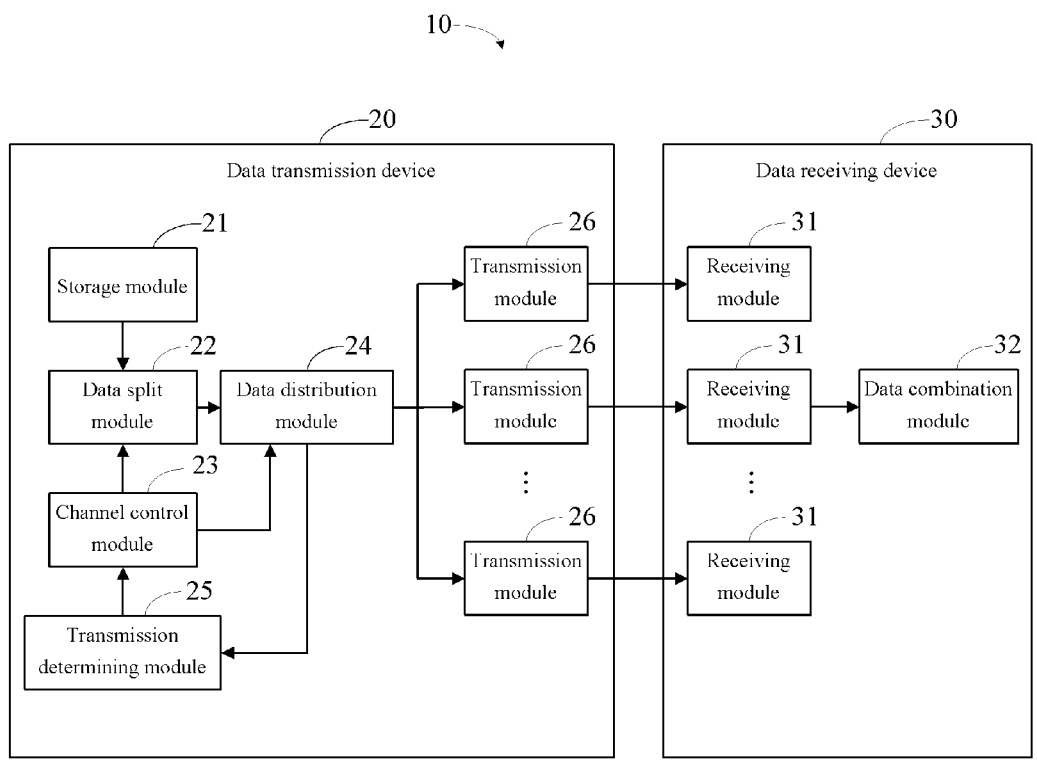
FIG. 1 is a block diagram of a system for transmitting data via multi-channel communications.

FIG. 1 shows a block diagram of a system 10 for transmitting data via multi-channel communications. The system 10 includes a data transmission device 20 and a data receiving device 30. The data transmission device 20 is configured to transmit a piece of data to the data receiving device 30 in response to a manual operation.

The data transmission device 20 includes a storage module 21, a data split module 22, a channel control module 23, a data distribution module 24 and a number of transmission modules 26. The number of transmission modules 26 can be modules under different transmission protocols. Such as, one is a Bluetooth transceiver and another is a WiFi transceiver. The data receiving device 30 includes a number of receiving modules 31. The transmission modules 26 are respectively corresponding to the receiving modules 31 and configured to communicate with the receiving modules 31 to build a number of transmission channels. Therefore, correspondingly, the number of receiving modules 31 can be modules under different transmission protocols. Such as, one is a Bluetooth transceiver and another is a WiFi transceiver. The transmission channels are corresponding to a number of data transmission modes. For example, one of the transmission modules 26 communicates with one of the receiving modules 31 to build a Bluetooth transmission channel corresponding to a Bluetooth transmission mode. Another one of the transmission modules 26 communicates with another one of the receiving modules 31 to build a WiFi transmission channel corresponding to a WiFi transmission mode.

The storage module 21 is configured to store data. The channel control module 23 is configured to provide manually selectable transmission modes and determine transmission channels and transmission modules 26 corresponding to selected transmission modes. The data split module 22 is configured to split a piece of data to be transmitted to a number of data segments. The number of the data segments is equal to the number of the determined transmission channels. The data segments are to be transmitted via the determined transmission channels. A size of each data segment is determined by a size of the piece of data and transmission speeds corresponding to the determined transmission channels, in order that transmissions in the determined transmission channels can be completed generally at the same time.

For example, the size of the piece of data is M. The determined transmission channels include three channels and the transmission speeds corresponding to the three channels are respectively a1 bit/s, a2 bit/s and a3 bit/s. Correspondingly, the data split module 22 splits the data to three data segments and the size of the three data segments are respectively $M \times a1/(a1+a2+a3)$, $M \times a2/(a1+a2+a3)$ and $M \times a3/(a1+a2+a3)$. Thus, the time to complete the transmission of each data segment via the corresponding determined transmission channel is $M/(a1+a2+a3)$, and the time to complete the transmission of the whole piece of data is also $M/(a1+a2+a3)$.

The data split module 22 is further configured to label a sequence number to each data segment. The data distribution module 24 is configured to distribute the labeled data segments to corresponding transmission modules 26 corresponding to the determined transmission channels to transmit the corresponding labeled data segments to the corresponding receiving module 31 via the corresponding determined transmission channels.

The receiving modules 31 corresponding to the determined transmission module 26 receive the corresponding labeled data segments. The data receiving device 30 further includes a data combination module 32. The data combination module 32 is configured to identify the sequence number of each labeled data segment and combine the labeled data segments according to the sequence numbers to recover the data.

In another exemplary embodiment, the data transmission device 20 further includes a transmission determining module 25. The transmission determining module 25 is configured to detect each transmission module 26 to determine whether the transmission module 26 completes the transmission of the corresponding data segment. The channel control module 23 is further configured to close the transmission module 26 to disconnect the transmission channel corresponding to the transmission module 26 when the transmission module 26 completes the transmission of the corresponding data segment.

Figure 2:
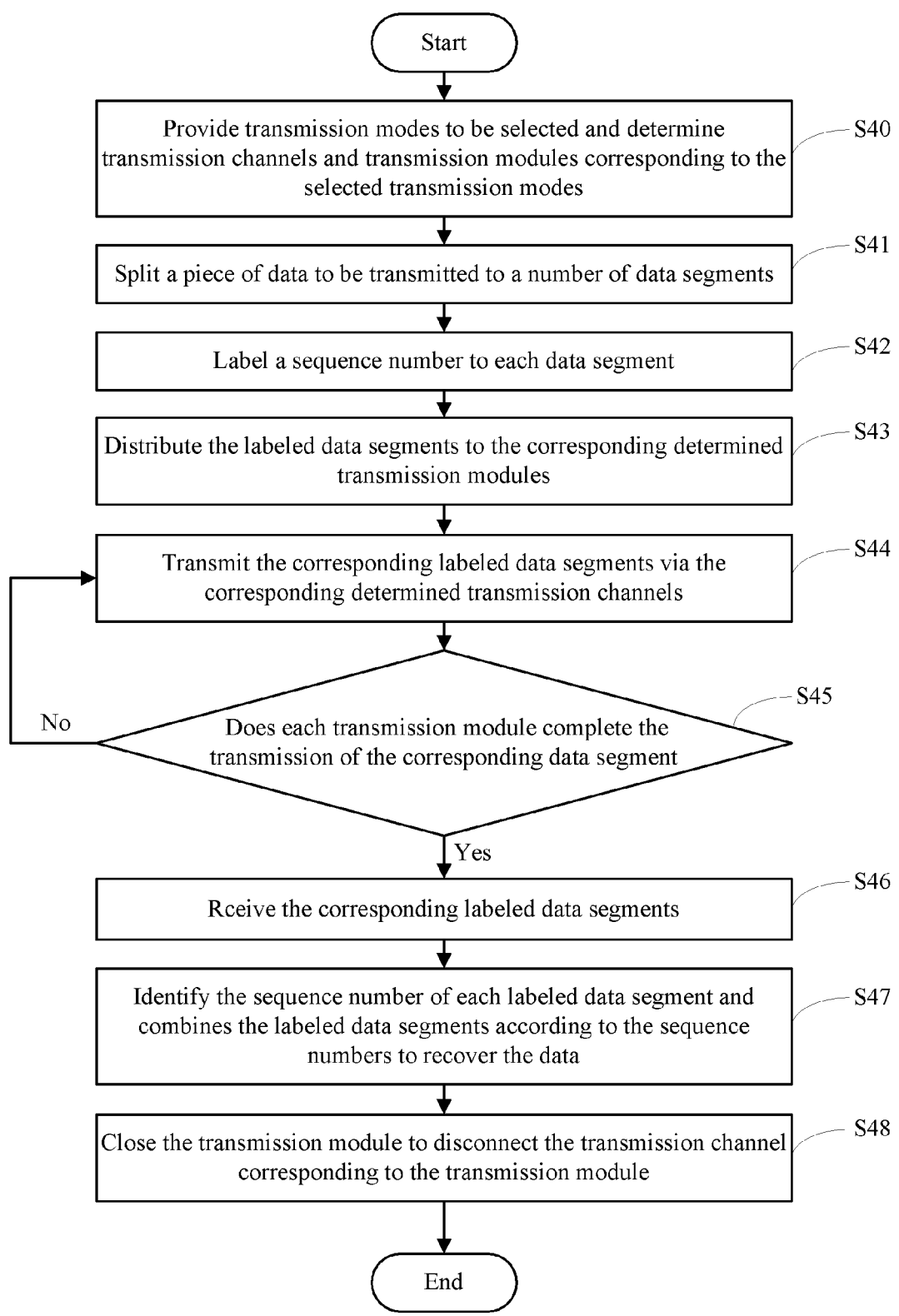
FIG. 2 is a flowchart of a method for transmitting data via multi-channel communications.

FIG. 2 shows a flowchart of a method for transmitting data via multi-channel communications.

In step S40, the channel control module 23 provides transmission modes to be selected and determines transmission channels and transmission modules 26 corresponding to the selected transmission modes.

In step S41, the data split module 22 splits a piece of data to be transmitted to a number of data segments. The number of the data segments is the same as the number of the determined transmission channels. The size of each data segment is determined by the size of the data and transmission speeds corresponding to the determined transmission channels, in order that transmissions in the determined transmission channels can be completed generally at the same time.

For example, the size of the piece of data is M. The determined transmission channels include three channels and the transmission speeds corresponding to the three channels are respectively a1 bit/s, a2 bit/s and a3 bit/s. Correspondingly, the data split module 22 splits the data to three data segments and the size of the three data segments are respectively $M \times a1/$ (a1+a2+a3), M×a2/(a1+a2+a3) and M×a3/(a1+a2+a3). Thus, the time to complete the transmission of each data segment via the corresponding determined transmission channel is M/(a1+a2+a3), and the time to complete the transmission of the whole piece of data is also M/(a1+a2+a3).

In step S42, the data split module 22 labels a sequence number to each data segment.

In step S43, the data distribution module 24 distributes the labeled data segments to the corresponding determined transmission modules 26.

In step S44, the determined transmission modules 26 transmit the corresponding labeled data segments via the corresponding determined transmission channels.

In step S45, the transmission determining module 25 detects each transmission module 26 to determine whether the transmission module 26 completes the transmission of the corresponding data segment. If the transmission module 26 completes the transmission of the corresponding data segment, the process goes to S46. Otherwise the process goes to S44.

In step S46, the receiving modules corresponding to the determined transmission channels receives the corresponding labeled data segments.

In step S47, the data combination module 32 identifies the sequence number of each labeled data segment and combines the labeled data segments according to the sequence numbers to recover the data.

In step S48, the channel control module 23 closes the transmission module 26 to disconnect the transmission channel corresponding to the transmission module 26.

It is to be understood, however, that even though numerous characteristics and advantages of the present disclosure have been set fourth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A system for transmitting data via multi-channel communication comprising a data transmission device and a data receiving device, wherein:
   the data receiving device comprises a plurality of receiving modules configured to receive data transmitted from the data transmission device;
   the data transmission device comprises:
   a storage module configured to store data;
   a plurality of transmission modules corresponding to the respective receiving modules and configured to communicate with the respective receiving modules to build a plurality of transmission channels for transmitting data in a plurality of data transmission modes;
   a channel control module configured to determine transmission modes selected by a user and determine the transmission channels corresponding to selected transmission modes;
   a data split module configured to split a piece of data to be transmitted to a plurality of data segments and label each data segment with a sequence number, a number of the data segments being equal to a number of the determined transmission channels, wherein a size of each data segment is determined according to a size of the piece of data and transmission speeds of the determined transmission channels, so as to enable transmissions in the determined transmission channels to be completed generally at the same time;
   a data distribution module configured to distribute the labeled data segments to the determined corresponding transmission modules to transmit the labeled data segments to the receiving modules corresponding to the determined transmission modules via the corresponding determined transmission channels; and
   at least one processor, for executing programs stored in the storage module and electrically connected with the transmission modules, channel control module, the data split module, and the data distribution module;
   the data receiving device further comprises:
   a data combination module configured to identify the sequence number of each labeled data segment received by the receiving modules and combine the labeled data segments according to the sequence numbers to recover the piece of data,
   a storage unit; and
   at least one processing unit, for executing programs stored in the storage unit and electrically connected with the receiving modules, and the data combination module.

2. The system as described in claim 1, wherein the data transmission device further comprise a transmission determining module, the transmission determining module is configured to detect whether each of the transmission modules completes the transmission of the corresponding data segment, the channel control module is further configured to close the transmission module to disconnect the transmission channel corresponding to the transmission module when the transmission module completes the transmission of the corresponding data segment.

3. A transmission device for transmitting data via multi-channel communications to a receiving device comprising a plurality of receiving modules, the transmission device comprising:
   a storage module configured to store data;
   a plurality of transmission modules corresponding to the plurality of receiving modules and configured to communicate with the receiving modules to build a plurality of transmission channels corresponding to a plurality of data transmission modes;
   a channel control module configured to provide transmission modes to a user for allowing the user to select the transmission modes and determine transmission channels and transmission modules corresponding to the selected transmission modes;
   a data split module configured to split a data to be transmitted to a plurality of data segments and label each data segment with a sequence number, a number of the data segments being equal to a number of the determined transmission channels, wherein a size of each data segment is determined according to a size of the piece of data and transmission speeds corresponding to the determined transmission channels, so as to enable transmissions in the determined transmission channels to be completed generally at the same time;
   a data distribution module configured to distribute the labeled data segments to corresponding determined transmission modules to transmit the labeled data segments to the receiving modules corresponding to the determined transmission modules via the corresponding determined transmission channels.

4. The transmission device as described in claim 3, further comprising a transmission determining module, the transmission determining module configured to detect whether each transmission module completes the transmission of the corresponding data segment, wherein the channel control module is further configured to close the transmission module to disconnect the transmission channel corresponding to the transmission module when the transmission module completes the transmission of the corresponding data segment.

5. A method for transmitting data via multi-channel communications comprising:
- providing transmission modes to a user for allowing the user to select the transmission modes and determining transmission channels corresponding to the selected transmission modes;
- splitting a piece of data to be transmitted to a number of data segments, the number of the data segments being equal to a number of the determined transmission channels, wherein a size of each data segment is determined according to a size of the data and transmission speeds of the determined transmission channels, so as to enable transmissions in the determined transmission channels to be completed generally at the same time;
- labeling each data segment with a sequence number;
- distributing the labeled data segments to the respective determined transmission modules; and
- transmitting the labeled data segments through the corresponding determined transmission channels.

6. The method as described in claim 5, further comprising:
- detecting whether each transmission module completes the transmission of the corresponding data segment; and
- closing the transmission module to disconnect the transmission channel corresponding to the transmission module when the transmission module completes the transmission of the corresponding data segment.

* * * * *